US010320882B2

(12) United States Patent
Dadlani et al.

(10) Patent No.: US 10,320,882 B2
(45) Date of Patent: Jun. 11, 2019

(54) UNIFORM RESOURCE LOCATOR DISCOVERY AND TRACKING FOR MANAGING SPONSORED DATA

(71) Applicant: AT&T Intellectual Property I, L.P., Atlanta, GA (US)

(72) Inventors: Rajendra Dadlani, Tustin, CA (US); Constance Goshgarian, Rancho Palos Verdes, CA (US); Maria Dillard, Redondo Beach, CA (US); Jeffrey Wilson, Palos Verdes Estates, CA (US); Ranny Sue, Laguna Niguel, CA (US); Umesh Balani, Redondo Beach, CA (US); Arlene Cava, Sylmar, CA (US); Michael McBride, Burbank, CA (US); Pankaj Sharma, Cypress, CA (US); Xavier D. Riley, Los Angeles, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/689,360

(22) Filed: Aug. 29, 2017

(65) Prior Publication Data
US 2019/0068683 A1    Feb. 28, 2019

(51) Int. Cl.
*H04N 21/858* (2011.01)
*H04L 29/08* (2006.01)
(Continued)

(52) U.S. Cl.
CPC .......... *H04L 67/025* (2013.01); *G06F 16/955* (2019.01); *G06Q 30/0273* (2013.01);
(Continued)

(58) Field of Classification Search
CPC .............. H04N 21/236; H04N 21/858; H04N 21/8586; G06Q 30/0273; H04M 15/8083;
(Continued)

(56) References Cited

U.S. PATENT DOCUMENTS

| 8,037,492 B2 | 10/2011 | Lash et al. |
| 8,555,367 B2 | 10/2013 | Syed et al. |

(Continued)

FOREIGN PATENT DOCUMENTS

| WO | 2009002999 A2 | 2/2009 |
| WO | 2009082821 A1 | 7/2009 |

(Continued)

OTHER PUBLICATIONS

"Amazon CloudFront—Dynamic Content Delivery", Amazon, aws.amazon.com (Jan. 12, 2013). 2 Pages.

(Continued)

*Primary Examiner* — Robert J Hance (57) ABSTRACT

In one example, the present disclosure describes a device, computer-readable medium, and method for discovering and tracking uniform resource locators (URLs) for the purposes of managing sponsored data. For instance, in one example, a method includes monitoring a request for a stream of data delivered to a user endpoint device via a content distribution network, wherein the stream of data is accessed via a digital content distribution application running on the user endpoint device, discovering a uniform resource locator associated with the stream of data, and updating a list of sponsored uniform resource locators in accordance with the discovering, wherein the sponsored uniform resource locators comprise uniform resource locators that are permitted to be accessed by the digital content distribution application without impacting a data allowance allocated to the user endpoint device.

20 Claims, 3 Drawing Sheets

(51) Int. Cl.
   *H04N 21/2668* (2011.01)
   *G06F 16/955* (2019.01)
   *G06Q 30/02* (2012.01)
   *H04M 15/00* (2006.01)
   *H04N 21/236* (2011.01)

(52) U.S. Cl.
   CPC ........ *H04L 67/22* (2013.01); *H04M 15/8083* (2013.01); *H04N 21/236* (2013.01); *H04N 21/2668* (2013.01); *H04N 21/858* (2013.01); *H04N 21/8586* (2013.01); *H04M 2215/0192* (2013.01)

(58) Field of Classification Search
   CPC .......... H04M 2215/0192; H04L 67/025; G06F 19/955
   See application file for complete search history.

(56) References Cited

U.S. PATENT DOCUMENTS

| | | | |
|---|---|---|---|
| 9,058,406 | B2 | 6/2015 | Soroca et al. |
| 9,077,821 | B2 | 7/2015 | Pallares et al. |
| 9,201,979 | B2 | 12/2015 | Ramer et al. |
| 9,444,948 | B1 | 9/2016 | Ren et al. |
| 9,582,816 | B2 | 2/2017 | Peebles et al. |
| 9,628,976 | B2 | 4/2017 | Jeong et al. |
| 9,628,977 | B2 | 4/2017 | Chai |
| 2009/0234861 | A1 | 9/2009 | Ramer et al. |
| 2011/0197237 | A1 | 8/2011 | Turner |
| 2013/0226863 | A1* | 8/2013 | Jonker .................... H04L 41/00 707/609 |
| 2015/0242903 | A1* | 8/2015 | Peebles .............. G06Q 30/0267 705/14.64 |
| 2015/0365379 | A1 | 12/2015 | Wu et al. |
| 2016/0253650 | A1* | 9/2016 | Cohen ................. G06Q 20/322 705/44 |
| 2016/0269765 | A1 | 9/2016 | Mandyam |
| 2016/0360043 | A1 | 12/2016 | Pacifici et al. |
| 2017/0109429 | A1 | 4/2017 | Sreenivas |
| 2017/0126903 | A1* | 5/2017 | Cohen ................... H04M 15/62 |
| 2017/0142264 | A1 | 5/2017 | Moon |
| 2018/0013769 | A1* | 1/2018 | Robinson .............. G06F 21/554 |

FOREIGN PATENT DOCUMENTS

| | | |
|---|---|---|
| WO | 2012152824 A1 | 11/2012 |
| WO | 201310184 A1 | 7/2013 |
| WO | 2015062036 A1 | 5/2015 |

OTHER PUBLICATIONS

Orly Bogler, "Can I allow access to uploaded images only to authenticated users?", Cloudinary, support.cloudinary.com (Jan. 8, 2017). 2 Pages. https://support.cloudinary.com/hc/en-us/articles/202519742-Can-I-allow-access-to-uploaded-images-only-to-authenticated-users-.

"Use a URL Service Data Control", Oracle, oracle.com, 2009. 4 Pages.

Kurt Thomas et al., Design and evaluation of a real-time url spam filtering service. Security and Privacy (SP), 2011 IEEE Symposium on. IEEE, 2011. 16 Pages.

* cited by examiner

UNIFORM RESOURCE LOCATOR DISCOVERY AND TRACKING FOR MANAGING SPONSORED DATA

The present disclosure relates generally to digital data distribution, and relates more particularly to devices, non-transitory computer-readable media, and methods for discovering and tracking uniform resource locators in order to determine whether data accessed by an individual has been sponsored according to an arrangement with a service provider.

BACKGROUND

Providers of digital services may sponsor their customer's data. For instance, a digital service provider may sponsor entertainment video content, and an employer may sponsor the data usage for specific content (e.g., educational videos provided by a healthcare insurer) on behalf of customers who use a specific digital service provider. In this case, the customers can browse, stream, and enjoy applications from data sponsors without impacting their monthly data allowance.

SUMMARY

In one example, the present disclosure describes a device, computer-readable medium, and method for discovering and tracking uniform resource locators (URLs) for the purposes of managing sponsored data. For instance, in one example, a method includes monitoring a request for a stream of data delivered to a user endpoint device via a content distribution network, wherein the stream of data is accessed via a digital content distribution application running on the user endpoint device, discovering a first uniform resource locator associated with the stream of data, and updating a list of sponsored uniform resource locators in accordance with the discovering, wherein the sponsored uniform resource locators comprise uniform resource locators that are permitted to be accessed by the digital content distribution application without impacting a data allowance allocated to the user endpoint device.

In another example, a device includes a processor and a computer-readable medium storing instructions which, when executed by the processor, cause the processor to perform operations. The operations include monitoring a request for a stream of data delivered to a user endpoint device via a content distribution network, wherein the stream of data is accessed via a digital content distribution application running on the user endpoint device, discovering a first uniform resource locator associated with the stream of data, and updating a list of sponsored uniform resource locators in accordance with the discovering, wherein the sponsored uniform resource locators comprise uniform resource locators that are permitted to be accessed by the digital content distribution application without impacting a data allowance allocated to the user endpoint device.

In another example, a computer-readable medium stores instructions which, when executed by the processor, cause the processor to perform operations. The operations include monitoring a request for a stream of data delivered to a user endpoint device via a content distribution network, wherein the stream of data is accessed via a digital content distribution application running on the user endpoint device, discovering a first uniform resource locator associated with the stream of data, and updating a list of sponsored uniform resource locators in accordance with the discovering, wherein the sponsored uniform resource locators comprise uniform resource locators that are permitted to be accessed by the digital content distribution application without impacting a data allowance allocated to the user endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for discovering and tracking uniform resource locators (URLs) for the purposes of managing sponsored data. As discussed above, data usage for specific content may be sponsored on behalf of users of a specific digital service provider. In this case, the users can browse, stream, and enjoy applications from data sponsors without impacting their monthly data allowance. However, there are cases in which the digital service provider may not have direct control over the content it delivers, or in which the digital service provider may not have access to the URLs for the sponsored content in advance of providing the content, such as commercials embedded in video on demand (VOD) content.

Examples of the present disclosure capture, log, and whitelist both hypertext transfer protocol (HTTP) and hypertext transfer protocol over transport layer security (HTTPS) URL traffic initiated through a digital content distribution application on a user endpoint device. The logged URLs are then aggregated, for example by merging instances of similar URLs. URLs that cannot be aggregated with similar URLs may be considered to be newly "discovered" URLs that can be added to a whitelist (i.e., a list of URLs from which traffic will be allowed). The whitelist can be continually and incrementally updated over time based on the content that is accessed by the user endpoint device.

Figure 1:
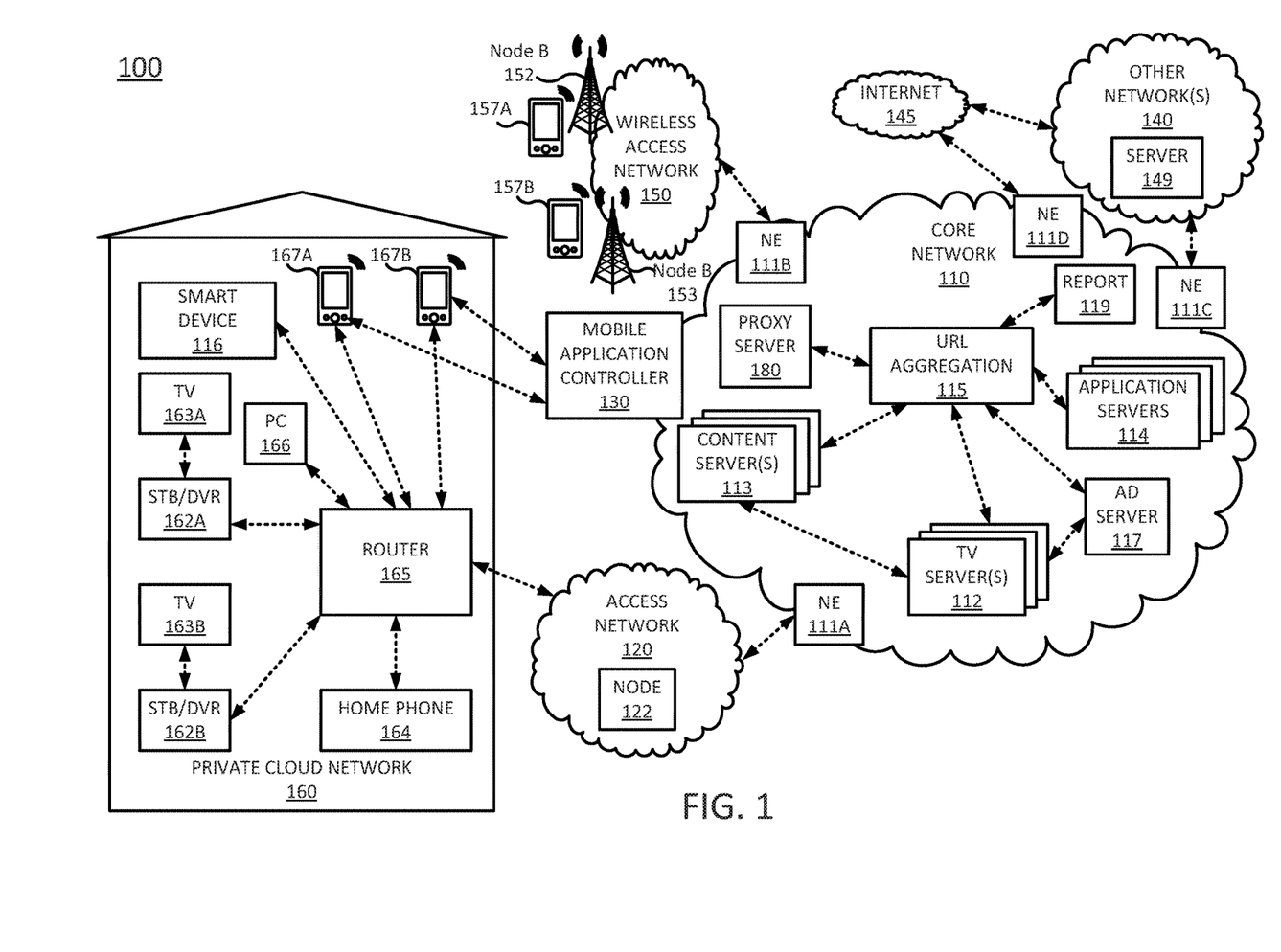
FIG. 1 illustrates an example content distribution network related to the present disclosure.

To better understand the present disclosure, FIG. 1 illustrates an example network 100, related to the present disclosure. As shown in FIG. 1, the network 100 may comprise a content distribution network that connects mobile devices 157A, 157B, 167A and 167B, and devices such as set-top boxes (STBs) 162A, and 162B, television (TV) 163A and TV 163B, router 165, personal computer (PC) 166, smart device 116 (e.g., smart thermostat, smart lighting system, intelligent personal assistant, etc.), and so forth, with one another and with various other devices via a core network 110, a wireless access network 150 (e.g., a cellular network), an access network 120, other networks 140 and/or the Internet 145. Mobile devices 157A, 157B, 167A and 167B, and devices such as set-top boxes (STBs) 162A, and 162B, television (TV) 163A and TV 163B, router 165, personal computer (PC) 166, and smart device 116 may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a satellite radio receiver or satellite television receiver, and the like. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a digital content distribution application that allows the user of the mobile device to access digital content such as videos, images, audio, web sites, and the like.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a proxy server 180, a URL aggregation server 115, a reporting server 119, and a mobile application controller 130. For ease of illustration, various additional elements of core network 110 are omitted from FIG. 1.

With respect to television service provider functions, core network 110 may include one or more third party television content (TV) servers 112 for the delivery of television content. In this regard, television servers 112 may interact with content servers 113 and advertising server 117 to select which video programs, or other content and advertisements to provide to the private cloud network 160 and to others.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the private cloud network 160, via the mobile devices 157A, 157B, 167A, and 167B, and at other downstream viewing locations. For example, advertisers may upload various advertising content to the core network 110 to be distributed to various viewers.

In one example, the mobile application controller 130 hosts an application that communicates with an application running on one of more of the mobile devices 157A, 157B, 167A, and 167B and/or other private cloud network devices (such as set-top boxes (STBs) 162A, and 162B, television (TV) 163A and TV 163B, router 165, personal computer (PC) 166, and/or smart devices 116). In further examples, the mobile application controller 130 may cooperate with one or more of the proxy server 180, URL aggregation server 115, reporting server 119, and/or application servers 114 to perform the methods disclosed herein relating to discovering, aggregating, and whitelisting sponsored URLs.

The proxy server 180 may log and discover both HTTP and HTTPS URLs accessed by the mobile devices 167A and 167B and/or other devices in the private cloud network 160. The URLs may include sponsored URLs. The proxy server 180 passes the discovered HTTP and HTTPS URLs to the URL aggregation server 115.

In one example, the URL aggregation server 115 aggregates the discovered HTTP and HTTPS URLs. In one example, aggregating URLs comprises merging similar URLs, for example by determining the longest common URLs. The URL aggregation server 115 forwards aggregated HTTP and HTTPS URLs to the reporting server 119.

The reporting server 119 identifies newly discovered HTTP and HTTPS URLs in the aggregated HTTP and HTTPS URLs forwarded by the aggregation server 115. The reporting server 119 may include these newly discovered HTTP and HTTPS URLs in a list of URLs to be sponsored. In one example, the reporting server 119 updates this list incrementally, e.g., as new HTTP and HTTPS URLS are discovered and/or as previously discovered HTTP and HTTPS URLs fail to appear in the logs of the proxy server 180 for a threshold period of time.

Figure 3:
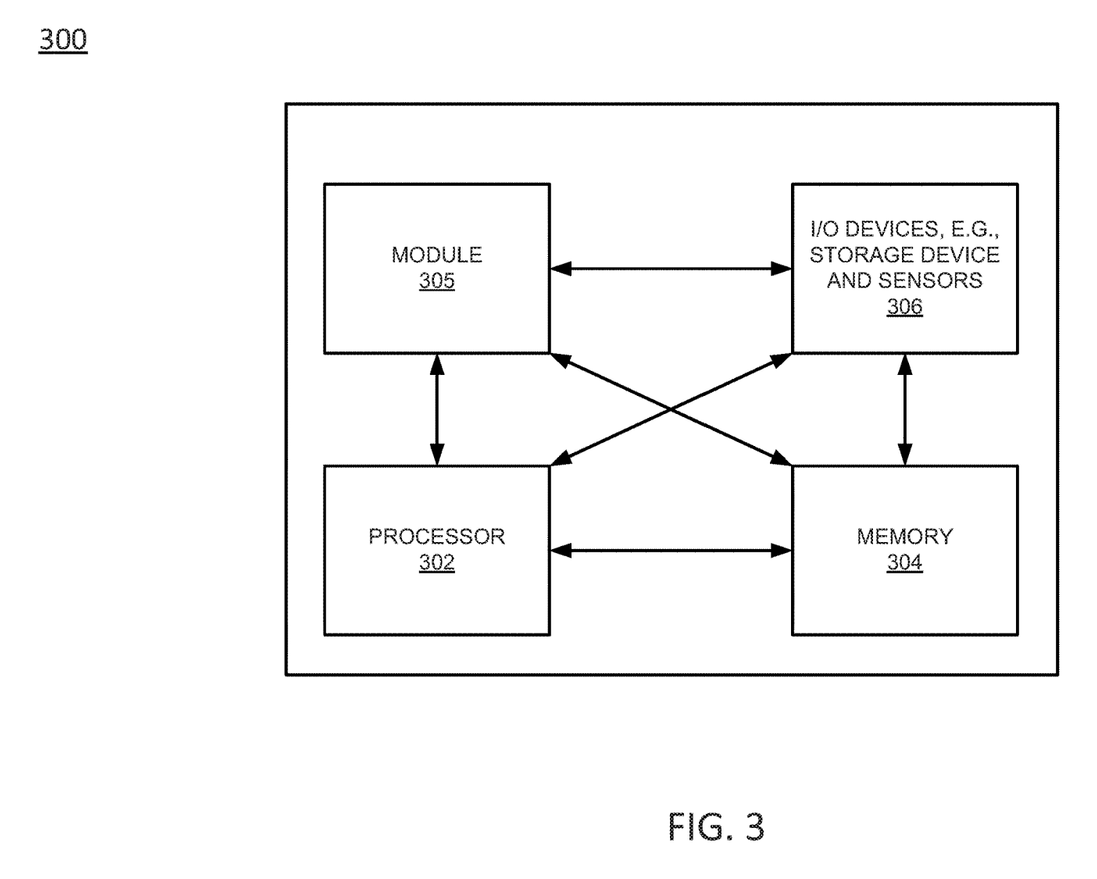
FIG. 3 depicts a high-level block diagram of a computing device specifically programmed to perform the functions described herein.

In one example, any or all of the television servers 112, content servers 113, application servers 114, aggregation server 115, advertising server 117, and mobile application controller 130 may comprise a computing system, such as computing system 300 depicted in FIG. 3.

In one example, the access network 120 may comprise a Digital Subscriber Line (DSL) network, a Local Area Network (LAN), a cellular or wireless access network, a $3^{rd}$ party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between private cloud network 160 and core network 110 relating to communications with web servers via the Internet 145 and/or other networks 140, and so forth.

In one example, private cloud network 160 may include a router 165, which receives data/communications associated with different types of media, e.g., television, phone, and Internet, and separates these communications for the appropriate devices. The data/communications may be received via access network 120, for instance. In one example, television data files are forwarded to set-top boxes (STBs)/digital video recorders (DVRs) 162A and 162B to be decoded, recorded, and/or forwarded to television (TV) 163A and TV 163B for presentation or to smart devices 116 for further action. Similarly, Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in private cloud network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
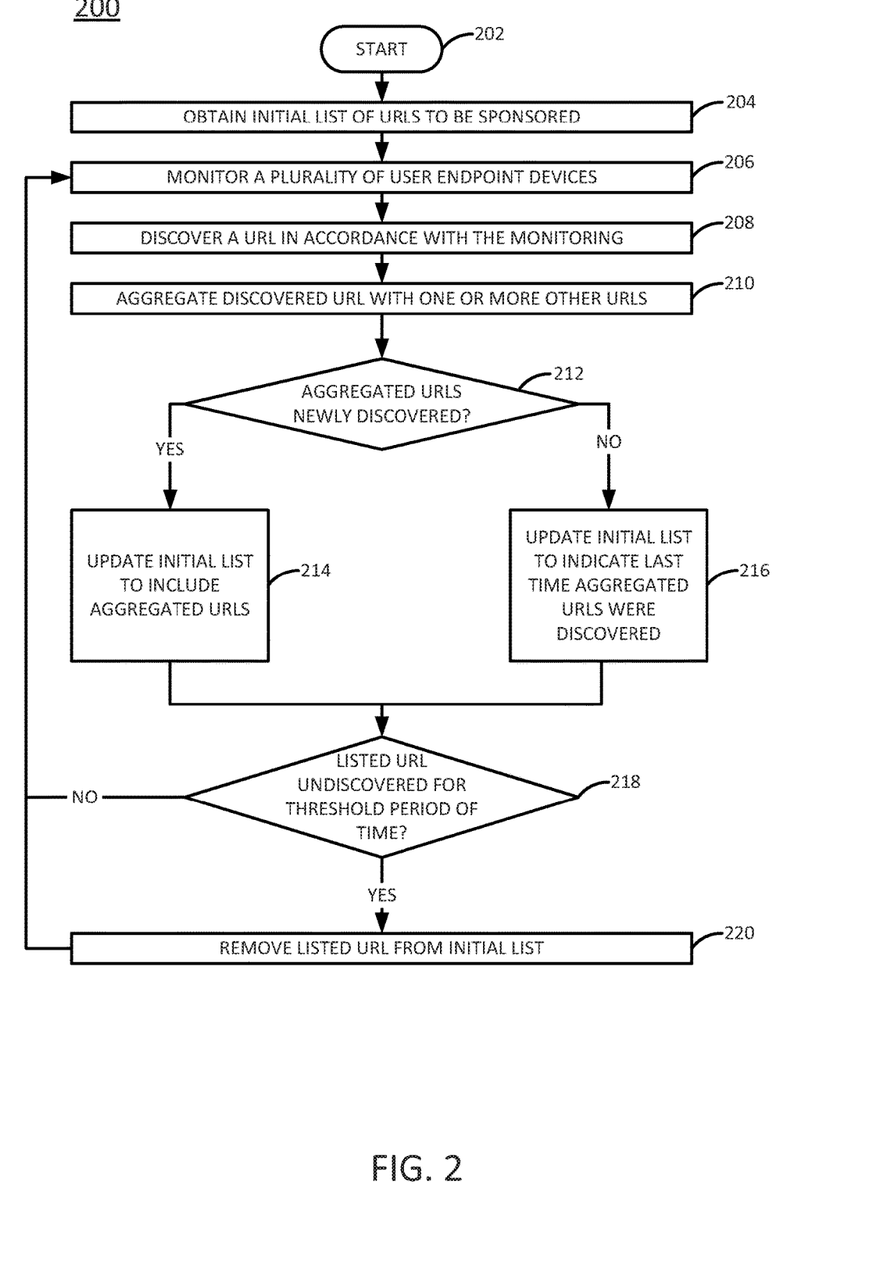
FIG. 2 illustrates a flowchart of an example method for discovering and publishing aggregated uniform resource locators.

To further aid in understanding the present disclosure, FIG. 2 illustrates a flowchart of an example method 200 for discovering and publishing aggregated uniform resource locators, e.g., for the purpose of sponsoring application layer data over the HTTP and HTTPS communication protocols. In one example, the method 200 may be performed by a network of devices such as the proxy server 180, the URL aggregation server 115, the reporting server 119, the mobile application controller 130 and/or additional devices illustrated in FIG. 1. However, in other examples, the method 200 may be performed by another device or devices (e.g., one or more application servers 114 or other device(s)). As such, any references in the discussion of the method 200 to components of FIG. 1 are not intended to limit the means by which the method 200 may be performed.

The method 200 begins in step 202. In step 204, an initial list of URLs to be sponsored is obtained, e.g., by the reporting server 119. The initial list may comprise a plurality of HTTP and/or HTTPS URLS that are available to be sponsored (e.g., that may be accessed by digital content distribution applications running on a user endpoint device without impacting a data allowance allocated to the user endpoint device).

In step 206, a plurality of user endpoint devices (such as mobile devices 167A and 167B, and other network devices in the private cloud network 160 such as set-top boxes (STBs) 162A, and 162B, television (TV) 163A and TV 163B, router 165, personal computer (PC) 166, and smart device 116) are monitored, e.g., by an application or automation controller running on the user endpoint devices that is in communication with the mobile application controller 130. In one example, the monitoring comprises continuously browsing, playing, and/or navigating digital content and associated URLs (which may be required to be sponsored) on the user endpoint devices.

In step 208, a URL (e.g., a first URL) is discovered in accordance with the monitoring, e.g., by the proxy server 180. In one example the discovered URL is an HTTP or HTTPS URL that was accessed by one or more of the user endpoint devices. The complete path of the URL may be discovered from a request to stream data (e.g., a stream of data packets) that is routed through the proxy server 180 in step 208.

In step 210, the discovered URL is aggregated with one or more other URLs (e.g., at least a second URL), e.g., by the URL aggregation server 115. The one or more other URLs may be newly discovered (e.g., in step 208) and/or may have been included on the initial list of URLs. In one example, URLs are aggregated by searching for the longest common path (e.g., substring or prefix) of a URL to be sponsored, where aggregated URLs share the longest common path. For instance, different variants of a URL having the same top level domain may be aggregated.

In step 212, it is determined, e.g., by the reporting server 119, whether the aggregated URLs are newly discovered (e.g., whether the aggregated URLs are already present on the initial list obtained in step 204).

If it is determined in step 212 that the aggregated URLs are newly discovered, then the method 200 proceeds to step 214. In step 214, the initial list obtained in step 204 is updated, e.g., by the reporting server 119, to include the aggregated URLs. In one example, updating the initial list may also indicate the last time that the aggregated URLs (e.g., at least one of the URLs included in the aggregated URLs) were discovered.

Alternatively, if it is determined in step 212 that the aggregated URLs are not newly discovered (e.g., already appear on the initial list obtained in step 204), then the method 200 proceeds to step 216. In step 216, the initial list is updated, e.g., by the reporting server 119, to indicate the last time that the aggregated URLs (e.g., at least one of the URLs included in the aggregated URLs) were discovered.

In step 218, it is determined whether any of the URLs on the initial list have gone undiscovered (e.g., not discovered by the proxy server 180) for at least a predefined threshold period of time. This determination may be made, for example, by comparing the last time that a URL was discovered (as indicated in the initial list) to the current time.

If it is determined in step 218 that a URL on the initial list has gone undiscovered for at least the predefined threshold period of time, then the method 200 proceeds to step 220. In step 220, the undiscovered URL is removed from the initial list. The method 200 then returns to step 206 and continues to monitor the plurality of user endpoint devices.

Alternatively, if it is determined in step 218 that no URLs on the initial list have gone undiscovered for at least the predefined threshold period of time, then the method 200 bypasses step 220 and returns directly to step 206.

Thus, the method 200 generates and incrementally updates a whitelist (i.e., a list of URLs from which traffic will be allowed) of HTTP and HTTPS URL traffic initiated from a digital content distribution application running on one or more user endpoint devices. This whitelist may be published, e.g., so that potential content sponsors can view URLs that are available for sponsorship. In the event that the digital content distribution application uses third party software development kits from content providers and vendors, the HTTP and HTTPS URLs used by the software development kits may not be known in advance for whitelisting and sponsorship. Thus, the method 200 may be performed on an ongoing basis, on multiple channels on multiple devices from a single application controller.

The method 200 can be used to detect changes in sponsored content, as well as to detect content (e.g., advertisements) that is slipped in and externally served by content and advertisement providers. Examples of the method 200 can also be used for different automation purposes on different types of mobile devices.

Moreover, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server or controller (such as might be used to perform the method 200) could be implemented as illustrated in FIG. 3.

As depicted in FIG. 3, the system 300 comprises a hardware processor element 302, a memory 304, a module 305 for discovering and tracking URLs, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for discovering and tracking URLs may include circuitry and/or logic for performing special purpose functions relating to discovering, aggregating, and whitelisting URLs for potential sponsorship. The input/output devices 306 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for discovering and tracking URLs (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for discovering and tracking URLs (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
    monitoring a request for a stream of data delivered to a user endpoint device via a content distribution network, wherein the stream of data is accessed via a digital content distribution application running on the user endpoint device;
    discovering a first uniform resource locator associated with the stream of data;
    updating a list of sponsored uniform resource locators that are available to be sponsored in accordance with the discovering, wherein the list of sponsored uniform resource locators comprises uniform resource locators that are permitted to be accessed by the digital content distribution application without impacting a data allowance allocated to the user endpoint device; and
    publishing the list of sponsored uniform resource locators that are available to be sponsored for viewing by a potential sponsor.

2. The method of claim 1, wherein the list of sponsored uniform resource locators that are available to be sponsored is obtained prior to the monitoring.

3. The method of claim 1, wherein the digital content distribution application browses, plays, and navigates digital content delivered via the content distribution network.

4. The method of claim 3, wherein the digital content distribution application browses, plays, and navigates the digital content in cooperation with a mobile application controller in the content distribution network.

5. The method of claim 1, wherein the discovering comprises:
    obtaining a complete path of the first uniform resource locator; and
    aggregating the first uniform resource locator with a second uniform resource locator, based on the complete path.

6. The method of claim 5, wherein the second uniform resource locator is also associated with the stream of data.

7. The method of claim 5, wherein the second uniform resource locator is included on the list of sponsored uniform resource locators that are available to be sponsored.

8. The method of claim 5, wherein the aggregating comprises:
    detecting that the first uniform resource locator and the second uniform resource locator share a longest common path.

9. The method of claim 8, wherein the longest common path comprises a common top level domain.

10. The method of claim 1, wherein the updating comprises:
    adding the first uniform resource locator to the list of sponsored uniform resource locators that are available to be sponsored, when the first uniform resource locator is not already present on the list of sponsored uniform resource locators that are available to be sponsored; and
    indicating, on the list of sponsored uniform resource locators that are available to be sponsored, a time at which the first uniform resource locator was last discovered.

11. The method of claim 1, wherein the updating comprises:
    determining that the first uniform resource locator is already present on the list of sponsored uniform resource locators that are available to be sponsored; and
    indicating, on the list of sponsored uniform resource locators that are available to be sponsored, a time at which the first uniform resource locator was last discovered.

12. The method of claim 1, wherein the updating comprises:
    determining that the first uniform resource locator has not been discovered for at least a predefined threshold period of time; and
    removing the first uniform resource locator from the list of sponsored uniform resource locators that are available to be sponsored.

13. The method of claim 1, wherein the monitoring, the discovering, and the updating are repeated on a continuous basis.

14. The method of claim 1, wherein the first uniform resource locator is a hypertext transfer protocol over transport layer security uniform resource locator.

15. The method of claim 1, wherein the first uniform resource locator is a hypertext transfer protocol uniform resource locator.

16. A device, comprising:
    a processor; and
    a computer-readable medium storing instructions which, when executed by the processor, cause the processor to perform operations, the operations comprising:
        monitoring a request for a stream of data delivered to a user endpoint device via a content distribution network, wherein the stream of data is accessed via a digital content distribution application running on the user endpoint device;
        discovering a uniform resource locator associated with the stream of data;
        updating a list of sponsored uniform resource locators that are available to be sponsored in accordance with the discovering, wherein the list of sponsored uniform resource locators comprises uniform resource locators that are permitted to be accessed by the digital content distribution application without impacting a data allowance allocated to the user endpoint device; and
        publishing the list of sponsored uniform resource locators that are available to be sponsored for viewing by a potential sponsor.

17. The device of claim 16, wherein the updating comprises:

adding the uniform resource locator to the list of sponsored uniform resource locators that are available to be sponsored, when the uniform resource locator is not already present on the list of sponsored uniform resource locators that are available to be sponsored; and indicating, on the list of sponsored uniform resource locators that are available to be sponsored, a time at which the first uniform resource locator was last discovered.

18. A non-transitory computer-readable medium storing instructions which, when executed by the processor, cause the processor to perform operations, the operations comprising:

monitoring a request for a stream of data delivered to a user endpoint device via a content distribution network, wherein the stream of data is accessed via a digital content distribution application running on the user endpoint device;

discovering a uniform resource locator associated with the stream of data;

updating a list of sponsored uniform resource locators that are available to be sponsored in accordance with the discovering, wherein the list of sponsored uniform resource locators comprises uniform resource locators that are permitted to be accessed by the digital content distribution application without impacting a data allowance allocated to the user endpoint device; and publishing the list of sponsored uniform resource locators that are available to be sponsored for viewing by a potential sponsor.

19. The non-transitory computer-readable medium of claim 18, wherein the updating comprises:

adding the uniform resource locator to the list of sponsored uniform resource locators that are available to be sponsored, when the uniform resource locator is not already present on the list of sponsored uniform resource locators that are available to be sponsored; and indicating, on the list of sponsored uniform resource locators that are available to be sponsored, a time at which the first uniform resource locator was last discovered.

20. The non-transitory computer-readable medium of claim 19, wherein the updating comprises:

determining the uniform resource locator has not been discovered for at least a predefined threshold period of time; and removing the uniform resource locator from the list of sponsored uniform resource locators that are available to be sponsored.

* * * * *